(12) United States Patent
Huebel et al.

(10) Patent No.: US 12,704,713 B2
(45) Date of Patent: Aug. 11, 2026

(54) OPTICAL PHASE ARRAY, LIDAR SYSTEM INCLUDING AN OPTICAL PHASE ARRAY, AND METHOD FOR PROCESSING AN OPTICAL PHASE ARRAY

(71) Applicant: Robert Bosch GmbH, Stuttgart (DE)

(72) Inventors: Alexander Huebel, Schorndorf (DE); Julia Amthor, Reutlingen (DE); Marc Schmid, Weissach (DE); Tobias Joachim Menold, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 925 days.

(21) Appl. No.: 18/060,008

(22) Filed: Nov. 30, 2022

(65) Prior Publication Data

US 2023/0176369 A1 Jun. 8, 2023

(30) Foreign Application Priority Data

Dec. 2, 2021 (DE) .................... 10 2021 213 707.5

(51) Int. Cl.

| | |
|---|---|
| ***G01S 7/48*** | (2006.01) |
| ***G01S 7/481*** | (2006.01) |
| ***G02B 27/00*** | (2006.01) |
| ***G02F 1/29*** | (2006.01) |

(52) U.S. Cl.

CPC ........ *G02B 27/0087* (2013.01); *G01S 7/4815* (2013.01); *G01S 7/4817* (2013.01); *G02F 1/292* (2013.01)

(58) Field of Classification Search

None

See application file for complete search history.

(56) References Cited

U.S. PATENT DOCUMENTS 11,415,673 B1 * 8/2022 Lin ...................... G01S 7/4813

FOREIGN PATENT DOCUMENTS

| | | | | |
|---|---|---|---|---|
| CN | 109219891 A | * | 1/2019 | .......... H10F 30/289 |
| DE | 102021201488 A1 | | 8/2022 | |
| EP | 3588142 A1 | * | 1/2020 | .......... G01S 7/4815 |
| JP | 2024167454 A | * | 12/2024 | ........ H10F 39/8063 |

* cited by examiner

*Primary Examiner* — Hovhannes Baghdasaryan

(74) *Attorney, Agent, or Firm* — NORTON ROSE FULBRIGHT US LLP

(57) ABSTRACT

An optical phase array. The optical phase array includes a sending and/or receiving surface with a regular arrangement of waveguiding antennas. Electromagnetic radiation is decoupleable from the antennas and/or coupleable into the antennas. At least one antenna includes at least partially amorphous silicon.

10 Claims, 8 Drawing Sheets

1
2
13
7
8
12
10
9
11
3
4
5
6
6
6
6
x
y 8, 31
12
13
22
18
19
21
16
17
14
20
15
x
y
z z
x
y
13
22
8, 32
23
8, 33
8, 34
8, 35
8, 36
24

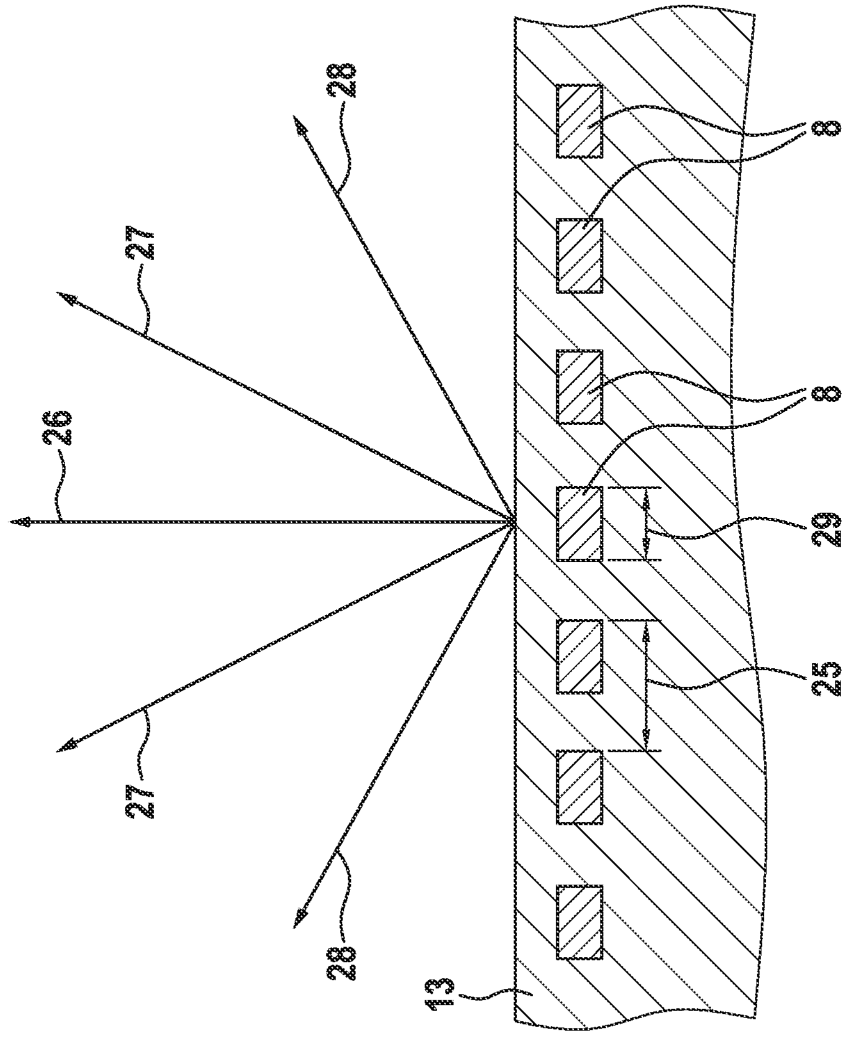
Fig. 4
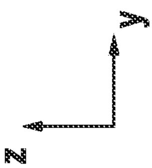

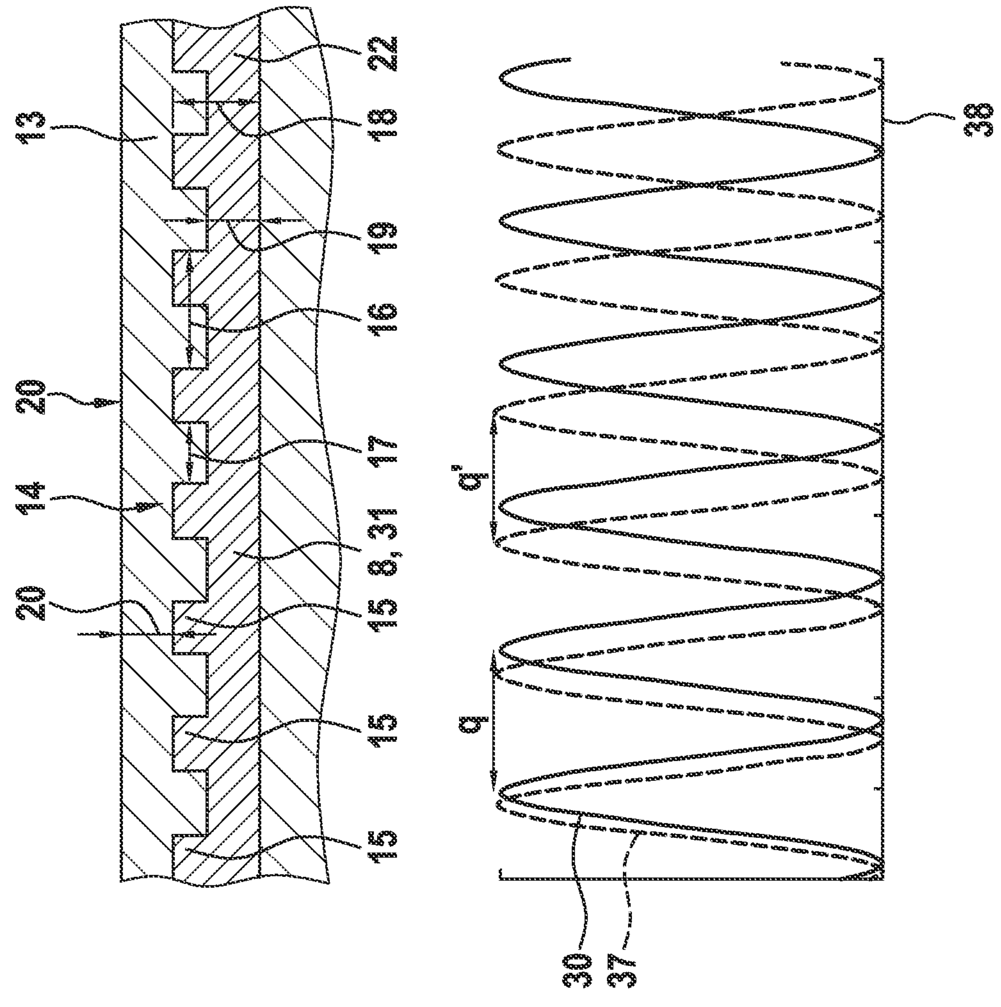
Fig. 5

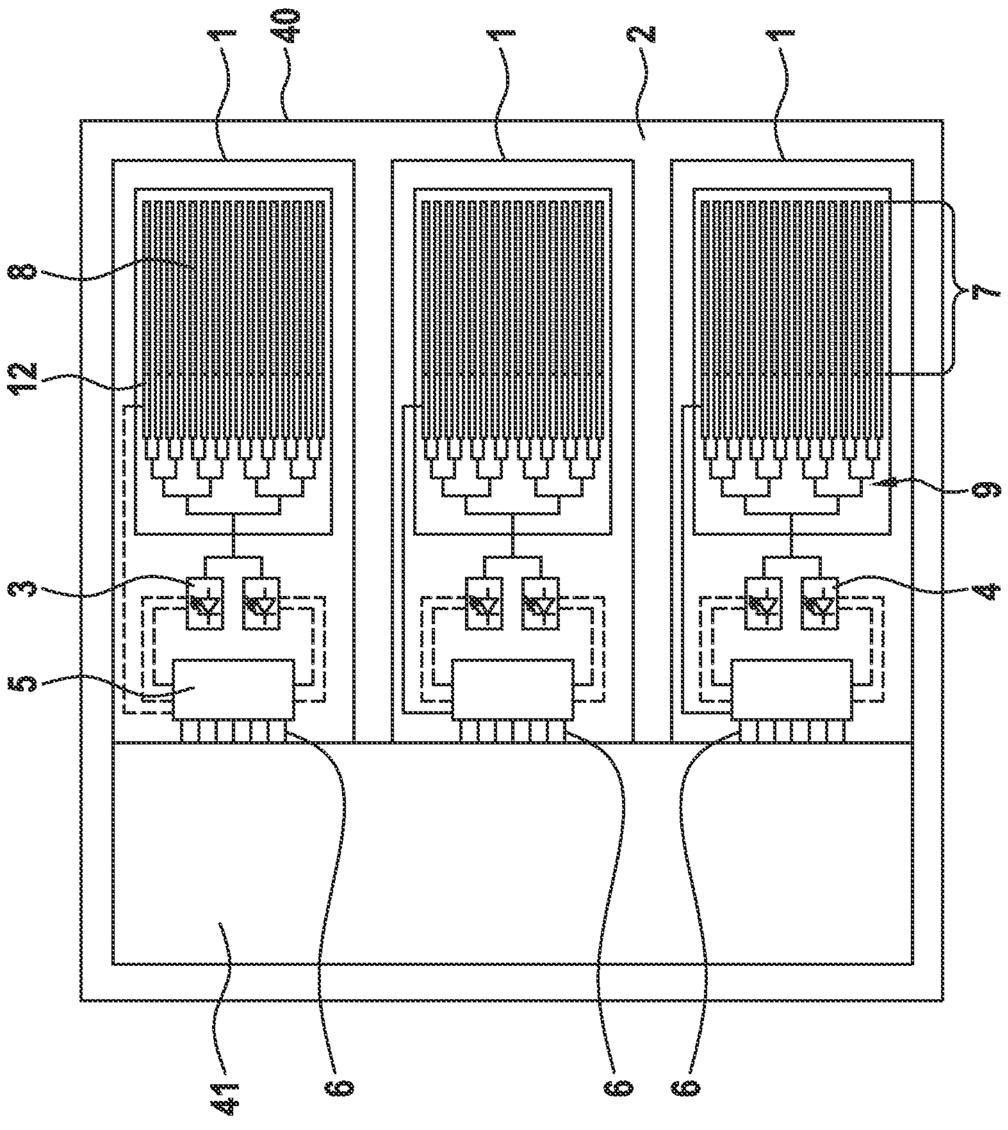
1
40
1
2
1
8
7
12
9
3
4
5
41
6
6
6
Fig. 8
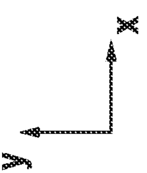
x
y

OPTICAL PHASE ARRAY, LIDAR SYSTEM INCLUDING AN OPTICAL PHASE ARRAY, AND METHOD FOR PROCESSING AN OPTICAL PHASE ARRAY

CROSS REFERENCE

The present application claims the benefit under 35 U.S.C. § 119 of German Patent Application No. DE 10 2021 213 707.5 filed on Dec. 2, 2021, which is expressly incorporated herein by reference in its entirety.

FIELD

The present invention relates to an optical phase array, a LIDAR system that includes an optical phase array, and a method for processing an optical phase array.

BACKGROUND INFORMATION

Optical phase arrays (OPAs) as beamforming and beam deflection units which may be used for distance measurement, for example, are described in the related art. Optical phase arrays are integral parts of light detection and ranging (LIDAR) systems, for example. Conventional optical phase arrays include a laser for emitting, and a detector for detecting, electromagnetic radiation. In addition, optical phase arrays include a grid of antennas for sending and for receiving electromagnetic radiation. Beamforming and beam deflection may take place, for example, by setting a phase of electromagnetic radiation, guided by the antennas, for each antenna. In order to achieve, for example, constructive interference for beam emissions perpendicular to a chip surface, all antennas must be in phase. An arbitrary wavefront may be synthesized in this way.

However, one disadvantage of conventional optical phase arrays is that manufacturing defects in an OPA may generate random phase errors. In general, each OPA must therefore be calibrated. For each antenna, a phase shift with respect to a setpoint value is measured, and is stored and used as a correction value. Compared to two-dimensional OPAs, one-dimensional OPAs have the disadvantage that they may be calibrated only along a first dimension. Light waves propagate passively in a second dimension. As the result of manufacturing defects, this propagation in various antennas may take place at different speeds, so that after a certain distance, large deviations from an intended phase pattern may occur, possibly resulting in destructive interferences. This limits a maximum usable distance, and thus also a maximum providable beam diameter. However, in particular for use in a LIDAR system for a motor vehicle, it is important to have the largest possible beam diameter, for example 10 mm and greater, in order to achieve a high light intensity and thus a large range.

SUMMARY

An object of the present invention is to provide an improved optical phase array and a LIDAR system that includes an optical phase array, and a method for processing an optical phase array. This object is achieved by an optical phase array, a LIDAR system that includes an optical phase array, and a method for processing an optical phase array, having the features of the the present invention. Advantageous refinements of the present invention are disclosed herein.

According to an example embodiment of the present invention, an optical phase array includes a sending and/or receiving surface with a regular arrangement of waveguiding antennas. Electromagnetic radiation is decoupleable from the antennas and/or coupleable into the antennas. At least one antenna includes at least partially amorphous silicon.

Amorphous silicon advantageously has a high refractive index, and thus good waveguiding properties with only small losses. In contrast to crystalline silicon, the refractive index of amorphous silicon may be modified. This so-called “trimming” may take place, for example, by irradiation with a UV laser. A locally modified refractive index may advantageously compensate, at least in part, for a phase shift resulting from manufacturing defects. This is also possible after manufacture of the optical phase array.

Since the refractive index of amorphous silicon may be modified, a correction of manufacturing defects in two dimensions may take place, which makes it possible to manufacture particularly large-surface optical phase arrays. Due to the high refractive index of amorphous silicon, the antennas of the optical phase array may be situated very close to one another, the same as for crystalline and polycrystalline silicon, which may result in a high optical efficiency.

In one specific example embodiment of the prestn invention, the at least one antenna is completely formed by the amorphous silicon. The refractive index of the antenna may be advantageously modified in the entire area of the antenna in order to at least partially compensate for a phase shift, resulting from manufacturing defects of the antenna, of electromagnetic radiation that is guided by the antenna.

In one specific embodiment of the present invention, the at least one antenna includes a first core material and a second core material. The first core material and the second core material are situated on a substrate and embedded in a jacket material. The first core material is situated, in relation to the substrate, above the second core material. The first core material is formed by the amorphous silicon. The second core material includes crystalline silicon or silicon nitride. The refractive index of the first core material may be advantageously modified by illumination, while the second core material has better waveguiding properties.

In one specific embodiment of the present invention, the at least one antenna includes a first core material and a second core material. The first core material and the second core material are situated on a substrate and embedded in a jacket material. The first core material is situated, in relation to the substrate, above the second core material. The second core material is formed by the amorphous silicon. The first core material includes silicon nitride. Silicon nitride is advantageously transparent in an ultraviolet spectral range. As a result, the second core material situated beneath the first core material may be illuminated in order to modify its refractive index.

In one specific embodiment of the present invention, each antenna of the sending and/or receiving surface includes at least partially amorphous silicon. As a result, the entire sending and/or receiving surface may advantageously be illuminated in order to modify the refractive indices of all antennas. All antennas of the optical phase array may typically have similar or identical manufacturing defects. For this reason, it may advantageously be sufficient to illuminate all antennas equally in order to modify the refractive indices of all antennas, so that undesirable phase shifts in the antennas may in each case be at least partially compensated for.

A LIDAR system includes at least one optical phase array according to one of the specific example embodiments of the present invention. The optical phase array of the LIDAR system includes at least one laser that is designed to emit electromagnetic radiation, and/or at least one detector that is designed to detect electromagnetic radiation. Undesirable phase shifts resulting from manufacturing defects of the antennas of the optical phase array may advantageously be at least partially compensated for by modifying a refractive index of at least one antenna. A more reliable LIDAR system may thus be provided.

According to an example embodiment of the present invention, a method for processing an optical phase array includes the following method steps: An optical phase array according to one of the described specific embodiments is provided. A phase shift of electromagnetic radiation resulting from a manufacturing defect of the at least one antenna, including at least partially amorphous silicon, is ascertained. At least one section of the at least one antenna including the amorphous silicon is illuminated in such a way that a change in the refractive index due to an absorption of electromagnetic radiation in the illuminated section is effectuated, and the ascertained phase shift due to the change in the refractive index is at least partially compensated for. An improved optical phase array may be advantageously provided in this way.

In one specific embodiment of the present invention, all antennas of the sending and/or receiving surface include at least partially amorphous silicon. All antennas are illuminated, a laser beam being scanned over the entire sending and/or receiving surface. In this way, phase shifts resulting from similar manufacturing defects of the antennas may be advantageously compensated for in an efficient manner.

In one specific embodiment of the present invention, the ascertainment of the phase shift takes place by microscopic examinations of the at least one antenna or via a beam analysis.

Within the scope of the method, phase shifts of guided electromagnetic radiation resulting from manufacturing defects may advantageously be eliminated in a targeted manner when information concerning the manufacturing defects and the phase shift is present.

In one specific embodiment of the present invention, an illumination time and an optical power during illumination of the at least one antenna are selected based on a calibration in order to compensate for the phase shift. A targeted change in the refractive index may be advantageously effectuated in this way.

The present invention is explained in greater detail in the following description in conjunction with schematic figures.

BRIEF DESCRIPTION OF THE DRAWINGS

FIG. 4 shows the optical phase array in a cross-sectional view in the area of the antennas.

FIG. 5 shows an adverse effect of manufacturing defects of the antennas.

FIG. 8 shows a LIDAR system including optical phase arrays, in a top view, according to an example embodiment of the present invention.

DETAILED DESCRIPTION OF EXAMPLE EMBODIMENTS

Figure 1:
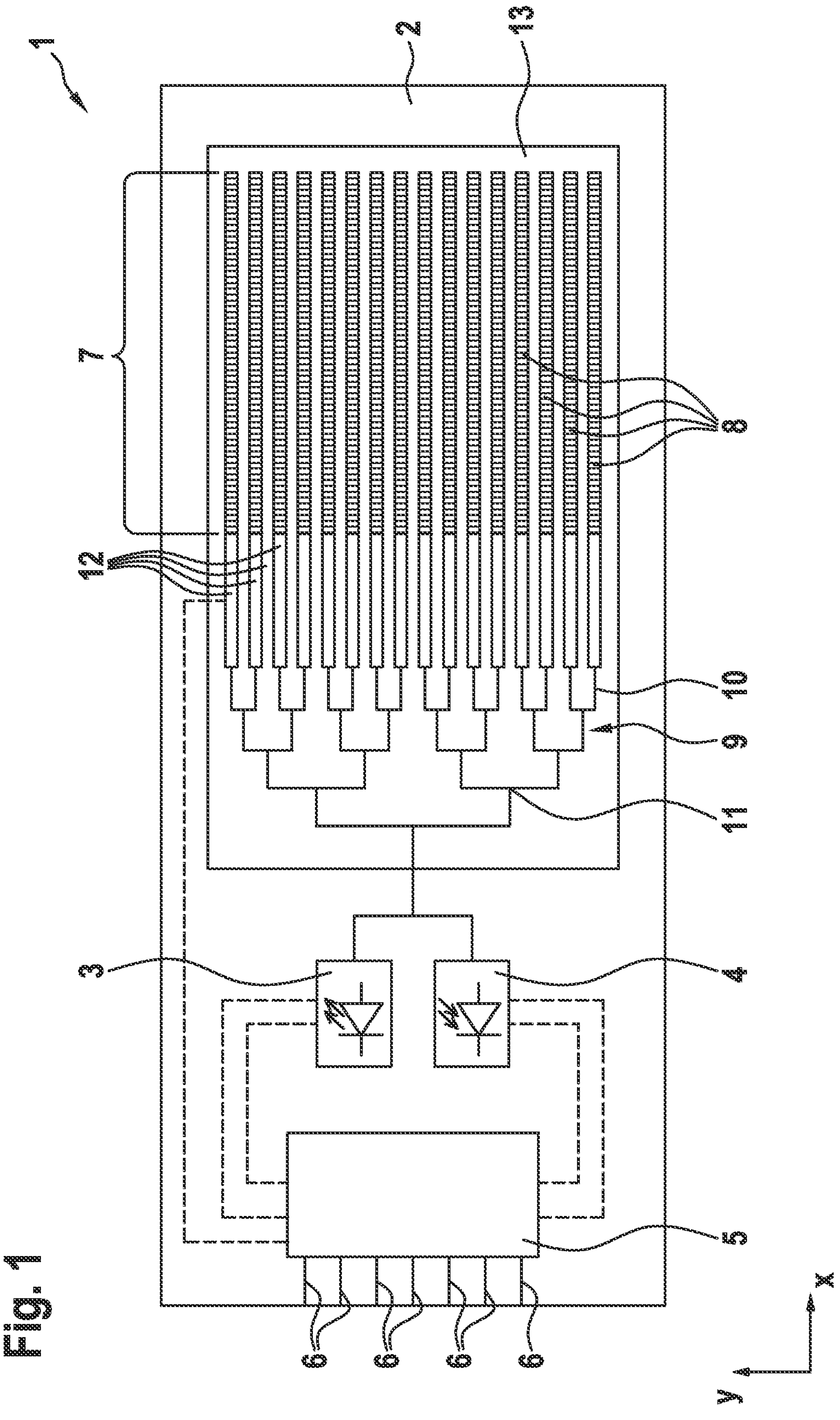
FIG. 1 shows an optical phase array in a top view, according to an example embodiment of the present invention.

FIG. 1 schematically shows an optical phase array 1 in a top view. Optical phase array 1 includes a substrate 2 and elements that are situated on substrate 2 or on a surface of substrate 2. Substrate 2 is designed as a silicon substrate as an example. Instead of silicon, substrate 2 may include some other material, for example another semiconductor material. Substrate 2 extends within a plane that is spanned by an x direction and a y direction extending perpendicularly with respect to the x direction.

Optical phase array 1 in FIG. 1 includes a laser 3 that is situated on substrate 2 and designed to emit electromagnetic radiation, and a detector 4 that is situated on substrate 2 and designed to detect electromagnetic radiation. However, laser 3 and/or detector 4 of optical phase array 1 may also be dispensed with.

Laser 3 may be designed as a diode laser, for example. Laser 3 is designed to emit electromagnetic radiation from a first spectral range. The first spectral range may be a narrow spectral range, in particular an essentially monochromatic spectral range. Laser 3 may also have a tunable design, as the result of which a wavelength of electromagnetic radiation emitted by laser 3 is adjustable. Laser 3 is designed, for example, to emit electromagnetic radiation from the visible spectral range or from the near-infrared spectral range. For example, laser 3 is designed to emit electromagnetic radiation within a wavelength range between 400 nm and 2000 nm. However, this value range is only an example and is not to be understood as limiting. The first spectral range defines a wavelength range or a wavelength at which optical phase array 1 is operated. Examples of typical light wavelengths for LIDAR systems are 940 nm, 1310 nm, or 1550 nm. Detector 4 may be designed as a photodiode, for example. Detector 4 is designed to detect at least electromagnetic radiation from the first spectral range.

For activating laser 3 and for activating and reading out detector 4, optical phase array 1 includes a driver circuit 5 that is situated on substrate 2 and connected to laser 3 and detector 4. Driver circuit 5 is connectable to a controller via electrical inputs and outputs 6. However, driver circuit 5 does not necessarily have to be an integral part of optical phase array 1, and may also be dispensed with.

Optical phase array 1 also includes a sending and receiving surface 7 that is situated on substrate 2. If optical phase array 1 includes only laser 3, this is a strictly sending surface 7. If optical phase array 1 includes only detector 4, this is a strictly receiving surface 7.

In any case, sending and receiving surface 7 includes a plurality of waveguiding antennas 8 situated on substrate 2. Antennas 8 are configured in the form of a regular arrangement or a regular matrix. Antennas 8 of optical phase array 1 in FIG. 1 are configured, strictly by way of example, in the form of a regular one-dimensional grid. In this case, antennas 8 may have a length of several millimeters, for example. Alternatively, optical phase array 1 may also have a two-dimensional regular arrangement of antennas 8.

Antennas 8 are designed in each case for sending and/or for receiving electromagnetic radiation. For this purpose, antennas 8 each include a coupling grating. Antennas 8 are thus in each case structured, at least in part, in such a way that electromagnetic radiation that is emitted by laser 3 and coupled into antennas 8 in each case is decoupleable from antennas 8, and/or that coherent electromagnetic radiation that strikes antennas 8 is coupleable into antennas 8. The coupling gratings are indicated by a dashed-line illustration of antennas 8 in FIG. 1. Waveguiding antennas 8 may also be referred to as photonic antennas 8.

For coupling electromagnetic radiation emitted by laser 3 into antennas 8, optical phase array 1 includes a light distribution tree 9. Light distribution tree 9 includes waveguiding connecting elements 10 and light distributor elements 11 that are situated on substrate 2. As an example, the optical phase array in FIG. 1 includes a light distribution tree 9 for parallel feeding of antennas 8 with electromagnetic radiation. However, light distribution tree 9 may also have some other design; for example, light distribution tree 9 may be designed for the serial feeding of antennas 8. Light distribution tree 9 is also provided to supply detector 4 with coherent electromagnetic radiation that is received from antennas 8.

The coupling of electromagnetic radiation emitted by laser 3 into light distribution tree 9 or into waveguiding connecting elements 10 of light distribution tree 9 may take place via butt joint coupling, for example. The electromagnetic radiation emitted by the laser and coupled into light distribution tree 9 may likewise be coupled into antennas 8 via butt joint coupling, for example. However, light distribution tree 9 may also be dispensed with.

Optical phase array 1 additionally includes a plurality of phase shifters 12 that are situated on substrate 2 and connected in each case to light distribution tree 9 or in each case to a connecting element 10 of light distribution tree 9, and connected in each case to an antenna 8. Phase shifters 12 include a waveguide and a modulator. Coupling of electromagnetic radiation into the waveguides of phase shifters 12 may take place via butt joint coupling, for example.

The modulator of a phase shifter 12 is designed to modify a refractive index of the waveguide of phase shifter 12. This results in a phase shift of electromagnetic radiation that is guided by the waveguide of phase shifter 12. Phase shifters 12 may include, for example, modulators that effectuate a modification of the refractive indices of the waveguides of phase shifters 12 by applying an electrical field. Alternatively, the modulators may also be designed as heating elements. In this case, a change in the refractive index and a phase shift in the waveguides of phase shifters 12 may be thermally effectuated. Phase shifters 12 are connected to driver circuit 5 for activation by same. For the sake of clarity, FIG. 1 shows that only one phase shifter 12 is connected to driver circuit 5. However, phase shifters 12 may also be dispensed with.

Light distribution tree 9, phase shifters 12, and sending and receiving surface 7 form a so-called photonic integrated circuit. Waveguiding connecting elements 10 of light distribution tree 9 each include crystalline silicon, for example. However, connecting elements 10 may also include some other material, for example silicon nitride. The waveguides of optional phase shifters 12 likewise include, for example, crystalline silicon or some other material such as silicon nitride.

Light distribution tree 9, optional phase shifters 12, and antennas 8 are embedded in a jacket material 13 as an example. Jacket material 13 has a lower refractive index than light distribution tree 9, phase shifters 12, and antennas 8. This guarantees the waveguiding properties of connecting elements 10 of light distribution tree 9, of the waveguides of phase shifters 12, and of antennas 8. In particular, electromagnetic radiation may thus be guided in a single-mode manner. Jacket material 13 includes silicon dioxide, for example. However, jacket material 13 may also include some other material. However, light distribution tree 9, phase shifters 12, and antennas 8 may also be embedded in each case in separate jacket materials 13.

Optical phase array 1 allows an arbitrary wavefront electromagnetic radiation, which may be emitted from the surface of substrate 2 as a light beam or in the form of multiple light beams, to be synthesized, in that electromagnetic radiation that is emitted in each case by antennas 8 is brought to interference in the far field. Optical phase array 1 is thus used for beamforming and beam deflection. Electromagnetic radiation that is emitted by laser 3, coupled into antennas 8, and decoupled from antennas 8 via the coupling gratings may be reflected at an object, and electromagnetic radiation that is reflected at the object may strike sending and receiving surface 7, be coupled into antennas 8 via the coupling gratings, and supplied to detector 4 via light distribution tree 9. In this way, optical phase array 1 may be used, for example, for distance measurement, for example within the scope of a LIDAR system.

The coherence of the electromagnetic radiation necessary for the diffraction and interference is ensured by using a laser 3 as a light source. The beamforming and beam deflection may take place, for example, by using optional phase shifters 12 to vary in each case the phase of electromagnetic radiation to be coupled into antennas 8, and thus influence an interference pattern.

Alternatively, a beam deflection may also take place, for example, by changing a wavelength of a tunable laser 3. For example, it is also possible to carry out a distance measurement according to the so-called frequency-modulated continuous wave (FMCW) principle. Optical phase array 1 is combined with a tunable laser 3 whose frequency is linearly modulated. Received light is superimposed on the emitted laser light.

If optical phase array 1 includes only detector 4, optical phase array 1 is provided only for receiving coherent electromagnetic radiation of an external laser. The external laser is advantageously designed to emit electromagnetic radiation from the first spectral range. Coherent electromagnetic radiation that strikes sending and/or receiving surface 7 and is coupled into antennas 8 is suppliable to detector 4. Detector 4 may be designed to weight an amplitude of detected electromagnetic radiation. Data or signals provided by detector 4 may be added to a reception beam by use of a controller, for example. By adjusting the phase shifts via phase shifters 12, a reception beam is guidable in various directions, and incident electromagnetic radiation is selectively detectable from any direction.

Figure 2:
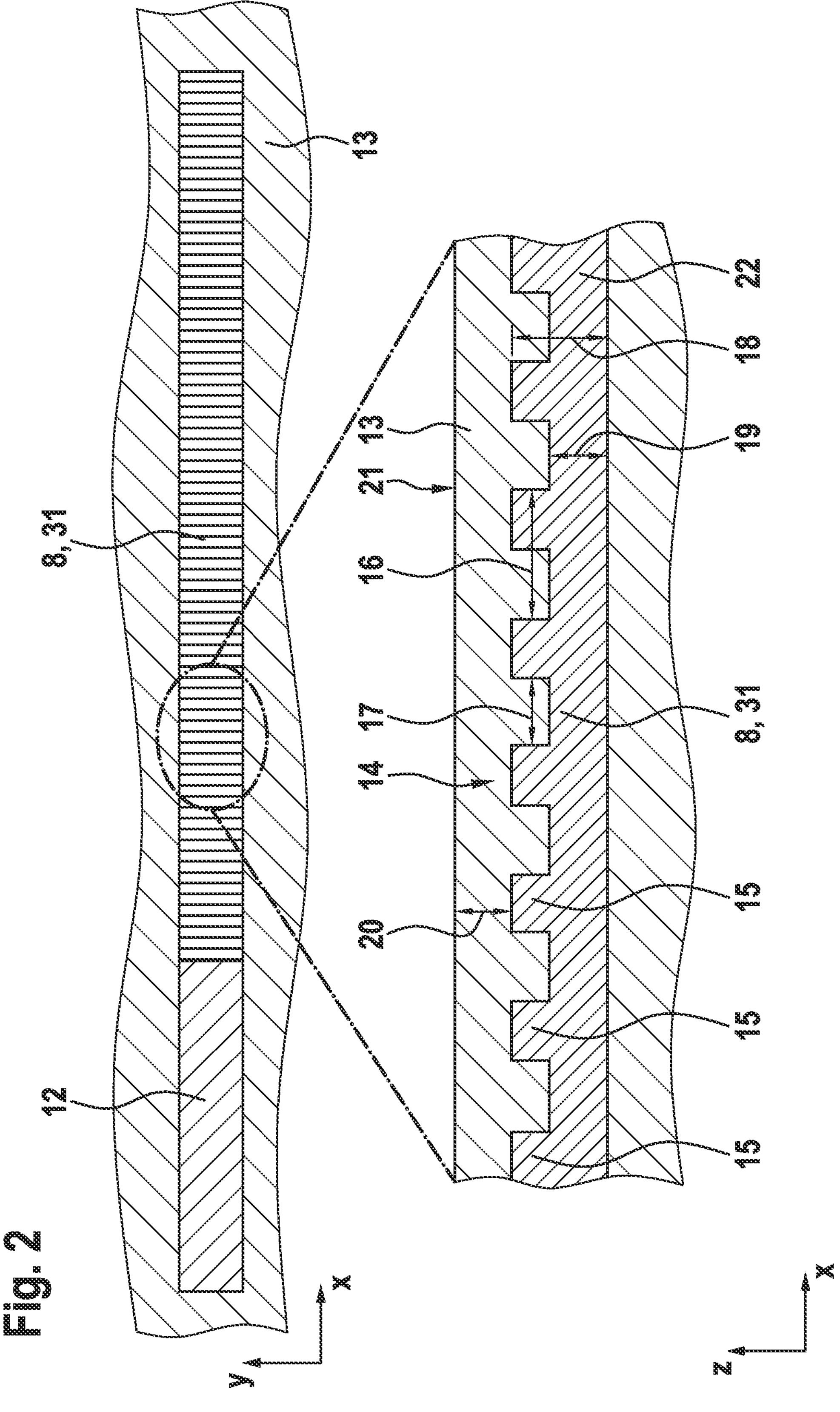
FIG. 2 shows a first specific embodiment of an antenna of the optical phase array from FIG. 1 in a cross-sectional view.

FIG. 2 schematically shows an example of a first specific embodiment of an antenna 8, 31 of optical phase array 1 from FIG. 1 together with an optional phase shifter 12 in a cross-sectional view along the y direction, and an enlargement of a section of antenna 8, 31. Jacket material 13 is only schematically indicated.

Antenna 8, 31 includes structuring that is periodically formed along the x direction. The periodic structuring of antenna 8, 31 forms a coupling grating 14 for decoupling electromagnetic radiation that is emitted by laser 3 and coupled into antenna 8, 31. Conversely, coupling grating 14 is designed to couple incident coherent electromagnetic radiation into antenna 8, 31. Coupling grating 14 thus forms a diffraction grating for coupling and/or decoupling electromagnetic radiation. The electromagnetic radiation that is coupled into antenna 8 is suppliable to detector 4 via antenna 8, 31, optionally phase shifters 12, and light distribution tree 9.

As an example, antenna 8 is structured in such a way that it includes protrusions 15 that are formed along a z direction that extends perpendicularly with respect to the x direction and the y direction, i.e., perpendicularly with respect to the surface of substrate 2, not illustrated in FIG. 2. The geometry of protrusions 15 may differ from the geometry of protrusions 15 shown in FIG. 2. Coupling grating 14 has a grating constant 16 and a gap width 17. Grating constant 16 indicates a period of coupling grating 14. Gap width 17 is specified by the minimum distance between two protrusions 15. Grating constant 16 and gap width 17 are advantageously selected in such a way that diffraction may occur, as the result of which electromagnetic radiation is coupleable into antenna 8, 31 or decoupleable from antenna 8, 31.

Antenna 8, 31 has an overall thickness 18 of 300 nm, for example. Without taking a thickness of protrusions 15 into account, antenna 8, 31 has a thickness 19 of 200 nm, for example. A minimum distance 20 between antenna 8, 31 or protrusions 15 of antenna 8, 31 and a surface 21 of jacket material 14 facing away from substrate 2 is 1 μm, for example. The stated values only represent examples. The particular distances and thicknesses may differ from the stated values.

At least one of antennas 8 of optical phase array 1 includes at least partially amorphous silicon (a-Si). Amorphous silicon has a structure which in contrast to crystalline silicon does not have long-range order. As an example, antenna 8, 31 according to the first specific embodiment is completely formed by the amorphous silicon. Each of antennas 8 of sending and/or receiving surface 7 may include at least partially amorphous silicon. In addition, all antennas 8 may be completely formed by the amorphous silicon. The amorphous silicon may be present in hydrogenated form (a-Si:H), for example. In this case, free bonds of amorphously situated silicon atoms are at least partially saturated with hydrogen.

Figure 3:
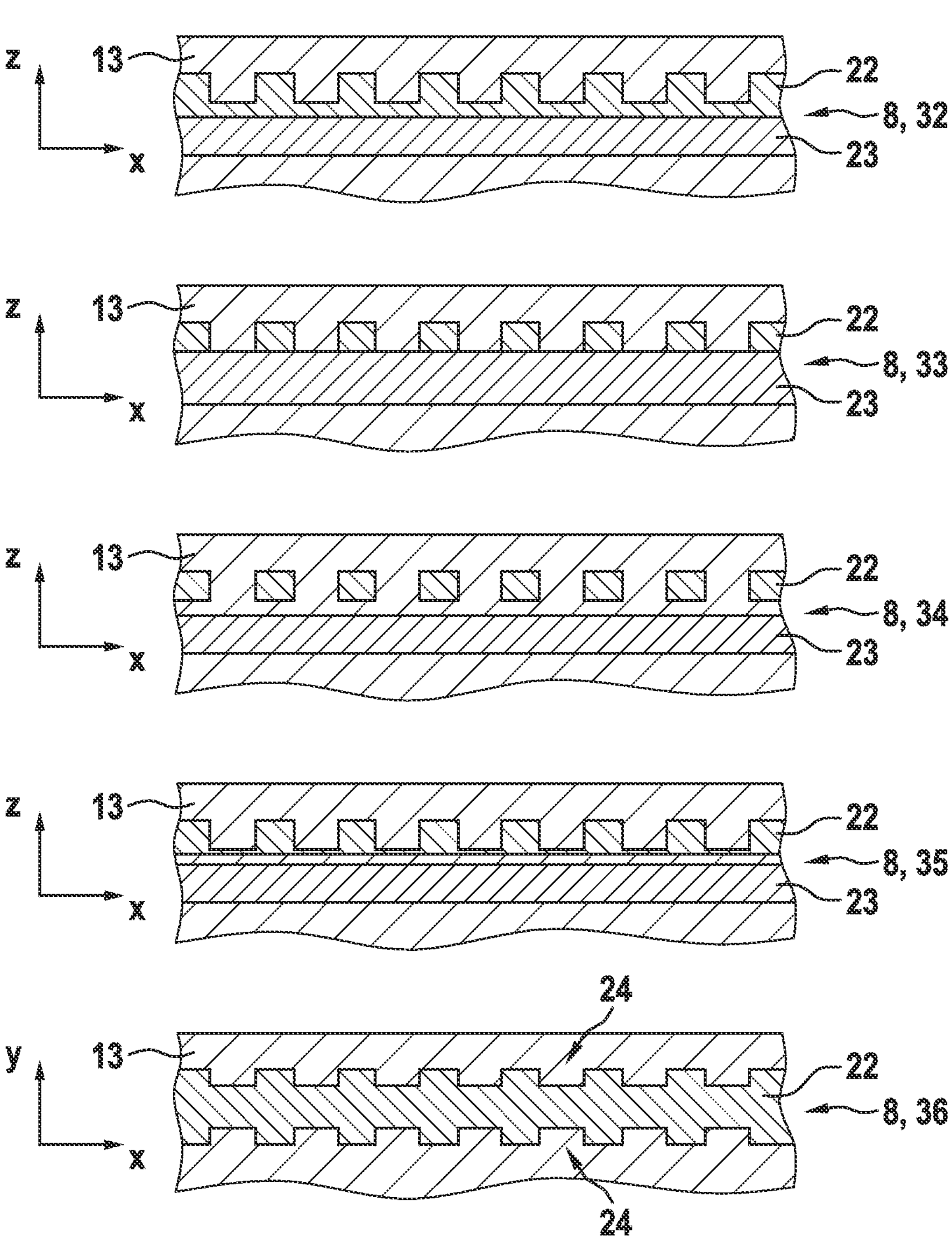
FIG. 3 shows further specific embodiments of an antenna of the optical phase array from FIG. 1.

FIG. 3 schematically shows further specific embodiments of antennas 8, 32, 33, 34, 35, 36 of optical phase array 1 from FIG. 1. All antennas 8 of optical phase array 1 advantageously have identical designs. FIG. 3 shows variations of antennas 8 strictly by way of example. However, optical phase array 1 may also include other antennas 8. An antenna 8, 36 according to a sixth specific embodiment is shown in a top view along the z direction. All other antennas 8, 32, 33, 34, 35 in FIG. 3 are shown in each case in a cross-sectional view along the y direction.

Antennas 8, 32, 33, 34, 35 according to a second, third, fourth, and fifth specific embodiment, in contrast to antenna 8, 31 according to the first specific embodiment and antenna 8, 36 according to the sixth specific embodiment, in each case include a second core material 23 in addition to first core material 22. First core material 22 and second core material 23 are situated on substrate 2. First core material 22 is situated, in relation to substrate 2, above second core material 23. For antennas 8, 32, 33 according to the second and third specific embodiments, first core material 22 and second core material 23 are situated directly on each other in the z direction. For antennas 8, 34, 35 according to the fourth and fifth specific embodiments, first core material 22 and second core material 23 are situated one on top of the other in the z direction; i.e., there is a distance between first core material 22 and second core material 23 in the z direction. This distance may be less than 100 nm, for example. However, the distance between first core material 22 and second core material 23 may also be greater than 100 nm. In this case, jacket material 13 is situated between core materials 22, 23 in each case and embeds core materials 22, 23. A decoupling intensity or a coupling intensity of electromagnetic radiation may be influenced by a spaced-apart arrangement of first core material 22 and second core material 23. A coupling is more effective the closer first core material 22 and second core material 23 are to one another.

For antennas 8, 32, 35 according to the second and fifth specific embodiments, first core material 22 has a contiguous design. In contrast, for antennas 8, 33, 34 according to the third and fourth specific embodiments, first core material 22 does not have a contiguous design. In these cases, first core material 22 is formed solely by protrusions 15 that form coupling gratings 14. The waveguiding property of antennas 8, 33, 34 is thus essentially completely reduced to second core material 23.

First core material 22 is formed by the amorphous silicon by way of example. Second core material 23 may include crystalline silicon, silicon nitride, or some other material, for example. Additional second core material 23 offers the advantage that it may enable more loss-free waveguiding than first core material 22. For example, crystalline silicon is less absorbent in the first spectral range, i.e., for electromagnetic radiation that is emitted by laser 3, than is amorphous silicon. As a result, electromagnetic radiation may be effectively transported over a greater distance before it is decoupled from antenna 8, 32, 33, 34, 35.

In another specific embodiment, second core material 23 is formed by the amorphous silicon. In this case, it is advantageous that first core material 22 includes silicon nitride. Silicon nitride offers the advantage that it is transparent in an ultraviolet spectral range. Alternatively, first core material 22 may also include crystalline silicon. However, in this case it is necessary for substrate 2 to be at least partially transparent to ultraviolet electromagnetic radiation. Transparency of first core material 22 and/or of substrate 2 is necessary to allow the second core material 23, which in this case is formed by the amorphous silicon, to be illuminated with ultraviolet electromagnetic radiation within the scope of a method for processing optical phase array 1, explained in greater detail below. If first core material 22 includes the silicon nitride, which is transparent in the ultraviolet spectral range, second core material 23 may be illuminated, for example, by situating and operating a UV laser at a side facing the top side of substrate 2. If first core material 22 includes crystalline silicon and substrate 2 has a transparent design, second core material 23 may be illuminated by situating and operating the UV laser at a side facing a bottom side of substrate 2. In contrast, if first core material 22 is formed by the amorphous silicon, it may be illuminated by situating and operating the UV laser at the side facing the top side of substrate 2, since jacket material 13 is transparent to ultraviolet electromagnetic radiation.

During manufacture of optical phase array 1, second core material 23 may be situated on substrate 2 with the aid of a bonding technique, for example, and joined to substrate 2. In contrast, first core material 22 may be deposited with the aid of gas phase deposition, for example. In the gas phase deposition, for example a silane may be used as precursor. This may facilitate formation of hydrogenated amorphous silicon. In addition, a hydrogen gas flow may result in hydrogenation of the amorphous silicon during the deposition. A refractive index of the amorphous silicon is a function of the extent of its hydrogenation. A number of silicon bonds saturated with hydrogen is a function of the hydrogen gas flow and of the temperature, and may thus be influenced.

In comparison to all other antennas 8, 31, 32, 33, 34, 35, antenna 8, 36 according to the sixth specific embodiment includes lateral coupling gratings 15. In this case, protrusions 15 that are generated by the structuring along the x direction extend along the y direction, not along the z direction, as the result of which electromagnetic radiation may be emitted laterally.

FIG. 4 schematically shows phase array 1 in a cross-sectional view in the area of antennas 8, along the x direction. Optical phase array 1 includes antennas 8, 31, 32, 33, 34, 35, 36 according to one of the specific embodiments in FIGS. 2 and 3, or antennas 8 having some other design.

Neighboring antennas 8 are separated by a distance 25. If this distance is greater than the wavelength at which optical phase array 1 is operated, grating diffraction occurs. However, often only one light beam and not multiple light beams, for example, is/are advantageously emitted. As an example, FIG. 4 shows that, for example, in addition to a desired zero-order diffraction, which represents a main beam 26, four secondary beams 27, 28 occur which represent a first-order diffraction and a second-order diffraction, respectively. Secondary beams 27, 28 result in an undesirable scattered light contribution, and at the same time, a reduced light output in main beam 26. Therefore, it is important for distance 25 between antennas 8, and consequently also an antenna width 29, to be as small as possible. Antennas 8 of optical phase array 1 may thus be arranged in such a way that distance 25 between antennas 8, and antenna width 29 effectuate only the emission of main beam 26.

To allow antennas 8 to be situated as closely together as possible on substrate 2, a refractive index difference between first core material 22 or optional second core material 23 and jacket material 13 that is as large as possible should be present. With crystalline silicon or amorphous silicon (n=3, 4) as core materials 22, 23 and silicon dioxide (n=1.5) as a jacket material 13, complete suppression of higher-order diffraction may be achieved, so that no diffraction losses occur, and the light output is emitted completely in main beam 26.

Since distances 25 between the antennas are to be as small as possible, in particular smaller than the wavelength at which optical phase array 1 is operated, guided modes in neighboring antennas 8 may have an overlap between their evanescent components. To reduce or avoid such an overlap, it is likewise advantageous to use core materials 22, 23 having the greatest possible refractive index.

One disadvantage of conventional optical phase arrays is that the antennas may have manufacturing defects. Manufacturing defects may be caused, for example, by deviations of grating constant 16 and/or of gap width 17 of coupling gratings 14, of overall thickness 18 of antennas 8, and/or of thickness 19 of antennas 8, for which the thickness of protrusions 15 is not taken into account. Such manufacturing defects may generate random phase errors. For loss-free functioning of optical phase array 1, the phase must be settable with high accuracy at each point of sending and/or receiving surface 7. The deviations from an ideal value must be much smaller than 180°, since otherwise, optical losses and scattered light occur due to destructive interference. The phase for each antenna 8 at a particular point of entry of the electromagnetic wave into antennas 8, but not the further profile of the phase along antennas 8, i.e., in the x direction, may be influenced via phase shifters 12.

FIG. 5 schematically shows the adverse effect of manufacturing defects of antennas 8. FIG. 5, by way of example and for the sake of clarity, once again shows antenna 8, 31 according to the first specific embodiment from FIG. 2, in a cross-sectional view. In addition, FIG. 5 shows a diagram of a location-dependent amplitude 30 of an ideally guided electromagnetic wave and a location-dependent amplitude 37 of a guided electromagnetic wave under the influence of manufacturing defects. Amplitudes 30, 37 are plotted on an ordinate. A position 38 is plotted on an abscissa. The diagram in FIG. 5, by way of example, relates to a 10 μm-long section of an antenna 8 of optical phase array 1.

Ideally, all antennas 8 should have the same geometric dimensions, i.e., same grating constant 16, same gap width 17, same overall thickness 18, and same thickness 19, for which the thickness of protrusions 15 is not taken into account, so that a periodicity of the guided electromagnetic wave assumes the same, ideal value q for all antennas 8. However, due to manufacturing defects, the dimensions from antenna 8 to antenna 8 may vary in the y direction, and also along a single antenna 8, i.e., in the x direction. As a result, an actual periodicity q' of the guided electromagnetic wave is location-dependent. FIG. 5 shows an example of a location at which actual periodicity q' is smaller than ideal value q. In this example, destructive interference would already occur after a path of 10 μm, so that antennas 8 would be usable up to a maximum length of 10 μm.

Figure 6:
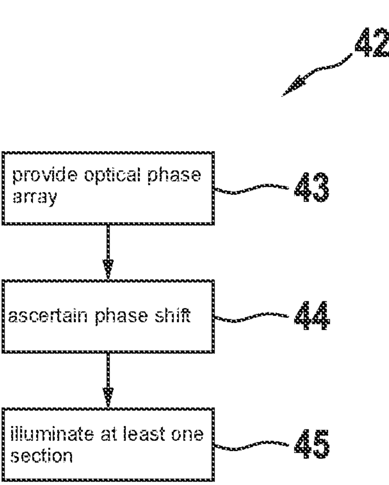
FIG. 6 shows method steps of a method for processing the optical phase array, according to an example embodiment of the present invention.
Figure 7:
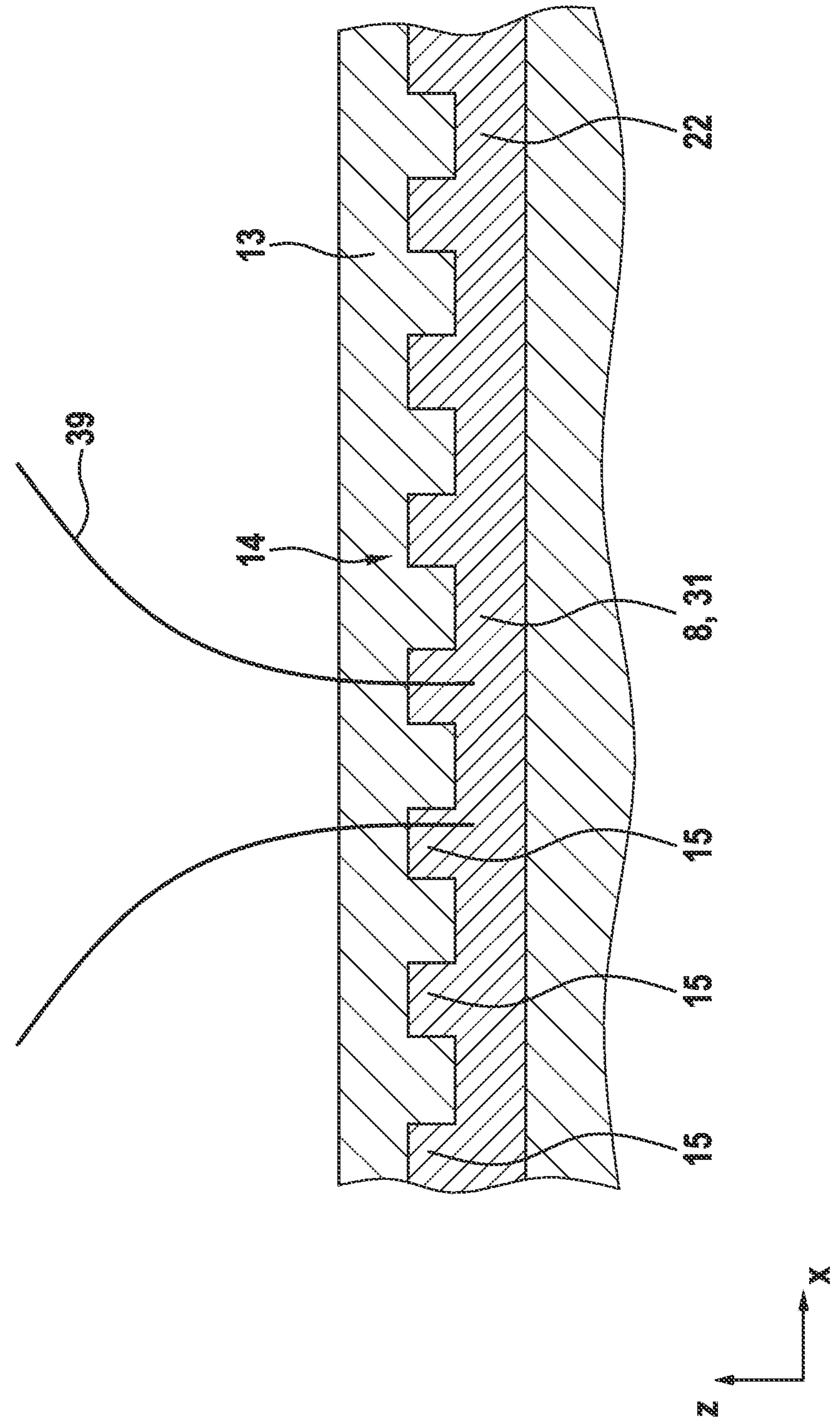
FIG. 7 shows a method step of the method from FIG. 6.

FIG. 6 schematically shows method steps 43, 44, 45 of a method 42 for processing an optical phase array 1. Method 42 allows the negative effect of manufacturing defects of antennas 8, explained in conjunction with FIG. 5, to be at least partially compensated for. Method 42 may also be referred to as a trimming method. FIG. 7 depicts a third method step 45 of method 42. Strictly by way of example, antenna 8, 31 according to the first specific embodiment is shown in a cross-sectional view; however, other specific embodiments of antennas 8, 32, 33, 34, 35, 36 may also be processed within the scope of the method.

Optical phase array 1 from FIG. 1 is provided in a first method step 43 of method 42. A phase shift of electromagnetic radiation resulting from a manufacturing defect of the at least one antenna 8, which includes at least partially amorphous silicon, is ascertained in a second method step 44. Information concerning manufacturing defects of antennas 8 that is necessary for processing antennas 8 of optical phase array 1 may be acquired, for example, by a microscopic examination and measurement of geometric dimensions of antennas 8. Based on this information, the phase shift generated as a result of the manufacturing defects may be arithmetically ascertained.

Alternatively or additionally, a light beam emitted by optical phase array 1 may be analyzed to allow conclusions to be drawn concerning information about the manufacturing defects. A beam analysis may take place with the aid of a so-called Hartmann-Shack sensor, for example. A Hartmann-Shack sensor includes a microlens array and a further detector for detecting electromagnetic radiation, for example a CCD chip or a CMOS chip. The microlens array is designed to image an incident wavefront onto the further detector. In this way, for example various cross-sectional phase profiles of a light beam that is emitted by optical phase array 1 may be detected, thus allowing deviations from an ideal beam profile to be identified. Once again, conclusions may thus be drawn concerning information about manufacturing defects and an associated phase shift of the at least one antenna 8. Alternatively or additionally, an interferometric beam analysis may also take place to allow conclusions to be drawn concerning information about manufacturing defects and phase shifts.

Within the scope of third method step 45 of method 42, at least one section of the at least one antenna 8, including amorphous silicon, of optical phase array 1 may be illuminated using a further laser. The further laser is not shown in FIG. 7. The further laser is designed to emit electromagnetic radiation from a second spectral range. In particular, the second spectral range may be an essentially monochromatic spectral range. The second spectral range may be situated outside the first spectral range, for example. The second spectral range may be an ultraviolet spectral range, for example. In this case, the further laser may also be referred to as a UV laser. However, the second spectral range is not limited to the ultraviolet spectral range. The second spectral range may also include visible spectral ranges, for example. The first and second spectral ranges may also be similar or identical. For example, the refractive index of the amorphous silicon may also be modified by inducing multiphoton absorption. In this case, the further laser may be operated, for example, in the same spectral range as laser 3, for example in the infrared spectral range.

Jacket material 13 is transparent to the electromagnetic radiation of the further laser. In contrast, the amorphous silicon of the at least one antenna 8 is absorbent for electromagnetic radiation from the second spectral range. Due to an action of a laser beam 39 of the further laser on antenna 8, its refractive index may be modified locally, i.e., in the illuminated section. Such a change in the refractive index is achievable in particular due to the fact that antenna 8 includes amorphous silicon. For crystalline silicon, for example, it would not be possible to effectuate such a change in the refractive index.

The change in the refractive index of the amorphous silicon is effectuated, for example, due to compaction as the result of heating. For high intensities of laser beam 39 of the further laser, a change in the refractive index of the amorphous silicon may also be effectuated due to nonlinear effects. For example, multiphoton absorption and field ionization may occur. The change in the refractive index of the amorphous silicon may also be achieved via a diffusion of hydrogen contained in the amorphous silicon. It is essential that method 42 allows the refractive index of the amorphous silicon to be locally and permanently changed. An undesirable phase shift of a guided electromagnetic wave as shown in FIG. 5 may thus be avoided. A change in the refractive index effectuated by the illumination may be, for example, one-hundredth or one-thousandth of the original refractive index, but is not limited thereto.

The section of the at least one antenna 8 is illuminated in third method step 45 in such a way that a change in the refractive index in the illuminated section is effectuated due to an absorption of electromagnetic radiation, and the ascertained phase shift is at least partially compensated for. The further laser may be operated continuously and/or in a pulsed manner during processing of optical phase array 1. A retention time of laser beam 39 in the section to be illuminated may be varied in such a way that the phase shift, which occurs due to the manufacturing defects, is corrected by the local change in the refractive index. In addition to the retention time, the change in the refractive index is also a function of the optical power of the further laser; therefore, the optical power may also be varied in order to compensate for the phase shift. Antenna 8 may have to be locally illuminated multiple times in order to fully compensate for the phase shift. An illumination time and an optical power for illuminating the at least one antenna 8 may be selected based on a calibration in order to compensate for the phase shift.

All antennas 8 of an optical phase array 1 typically have similar manufacturing defects. For example, polishing errors that were generated within the scope of manufacturing optical phase array 1 may be present. Such polishing errors are typically similar for all antennas 8, since after their deposition, they are polished simultaneously. In this case, laser beam 39 of the further laser is scanned over entire sending and/or receiving surface 7. Laser beam 39 may have a diameter of 100 μm, for example. However, the diameter of laser beam 39 may have some other value. For example, the diameter may be up to 1 mm or even greater. A scanning speed and/or an optical power of the further laser may be locally varied in order to at least partially compensate for nonuniform phase shifts due to inconsistent manufacturing defects. The at least one antenna 8 or all antennas 8 of sending and/or receiving surface 7 may have to be illuminated multiple times in order to achieve a desired compensation for the phase shift. A further phase shift may be ascertained after each illumination step in order to at least partially compensate for the further phase shift in a further illumination step; i.e., second and third method steps 44, 45 may be carried out iteratively to achieve a more efficient compensation for the phase shift.

FIG. 8 schematically shows a LIDAR system 40 in a top view along the z direction.

LIDAR system 40 includes three optical phase arrays 1 as an example. However, LIDAR system 40 may include an arbitrary number of optical phase arrays 1. Strictly by way of example, LIDAR system 40 includes optical phase arrays 1 according to the specific embodiment in FIG. 1. Optical phase arrays 1 each include one laser 3 and one detector 4 as an example. The different optical phase arrays 1 of LIDAR system 40 may each be provided for sending and/or for receiving electromagnetic radiation, and may be operated independently of one another and in parallel. For example, a data rate of LIDAR system 40 may be increased in this way. The various optical phase arrays 1 of LIDAR system 40 may be provided, for example, to generate different beams that are provided for scanning various solid angle ranges in the surroundings of a motor vehicle.

LIDAR system 40 also includes a controller 41. Controller 41 is connected to a driver circuit 5 via electrical inputs and outputs 6 in each case. Driver circuits 5 are designed, for example, to activate laser 3 and/or detector 4 and optionally phase shifters 12 by applying voltages, or to read out voltage signals of detector 4. Controller 41 is designed to digitally process control data and signals of detector 4. For example, LIDAR system 40 may be an integral part of a motor vehicle. In this case, controller 41 may be designed, for example, to generate an image of the surroundings of the motor vehicle, based on electromagnetic radiation that is reflected at objects in the surroundings and detected by at least one optical phase array 1.

A main observation direction of LIDAR system 40 is provided in an xz plane. Optical phase arrays 1 are designed to electronically deflect emitted light beams in the xy plane. A deflection in the xz plane may be achieved, for example, via a variation in the wavelength or by using movable mirrors that are rotatably or tiltably supported.

What is claimed is:

1. An optical phase array, comprising:

a regular arrangement of waveguiding antennas disposed on a sending and/or receiving surface, electromagnetic radiation being decoupleable from the waveguiding antennas and/or coupleable into the waveguiding antennas, wherein at least one waveguiding antenna of the waveguiding antennas includes at least one section comprising at least partially amorphous silicon, wherein the at least one section of the at least one waveguiding antenna is adapted to be illuminated in such a way that a change in a refractive index due to an absorption of electromagnetic radiation in the illuminated at least one section is effectuated and a phase shift due to the change in the refractive index is at least partially compensated for.

2. The optical phase array as recited in claim 1, wherein the at least one waveguiding antenna is completely formed by the amorphous silicon.

3. The optical phase array as recited in claim 1, wherein the at least one waveguiding antenna includes a first core material and a second core material, the first core material and the second core material are situated on a substrate and embedded in a jacket material, the first core material, in relation to the substrate, is situated above the second core material, the first core material is formed by the amorphous silicon, and the second core material includes crystalline silicon or silicon nitride.

4. The optical phase array as recited in claim 1, wherein the at least one waveguiding antenna includes a first core material and a second core material, the first core material and the second core material are situated on a substrate and embedded in a jacket material, the first core material, in relation to the substrate, is situated above the second core material, the second core material is formed by the amorphous silicon, and the first core material includes silicon nitride.

5. The optical phase array as recited in claim 1, wherein each waveguiding antenna of the waveguiding antennas of the sending and/or receiving surface includes at least partially amorphous silicon.

6. A LIDAR system, comprising:

at least one optical phase array including a regular arrangement of waveguiding antennas disposed on a sending and/or receiving surface, electromagnetic radiation being decoupleable from the waveguiding antennas and/or coupleable into the waveguiding antennas, wherein at least one waveguiding antenna of the waveguiding antennas includes at least one section comprising at least partially amorphous silicon, wherein the at least one section of the at least one waveguiding antenna is adapted to be illuminated in such a way that a change in a refractive index due to an absorption of electromagnetic radiation in the illuminated at least one section is effectuated and a phase shift due to the change in the refractive index is at least partially compensated for; and at least one laser configured to emit electromagnetic radiation and/or at least one detector configured to detect electromagnetic radiation.

7. A method for processing an optical phase array, the optical phase array including a sending and/or receiving surface with a regular arrangement of waveguiding antennas, electromagnetic radiation being decoupleable from the antennas and/or coupleable into the antennas, wherein at least one antenna of the antennas includes at least partially amorphous silicon, the method comprising the following steps:

providing the optical phase array;

ascertaining a phase shift of electromagnetic radiation resulting from a manufacturing defect of the at least one antenna that includes at least partially amorphous silicon;

illuminating at least one section of the at least one antenna, including the amorphous silicon, in such a way that a change in a refractive index due to an absorption of electromagnetic radiation in the illuminated section is effectuated, and the ascertained phase shift due to the change in the refractive index is at least partially compensated for.

8. The method as recited in claim 7, wherein an illumination time and an optical power during illumination of the at least one antenna are selected based on a calibration in order to compensate for the phase shift.

9. The method as recited in claim 7, wherein all antennas of the sending and/or receiving surface include at least partially amorphous silicon, all antennas are illuminated, and a laser beam is scanned over the entire sending and/or receiving surface.

10. The method as recited in claim 7, wherein the ascertainment of the phase shift takes place by microscopic examinations of the at least one antenna or via a beam analysis.

* * * * *